US012657227B2

(12) United States Patent
Baviskar et al.

(10) Patent No.: US 12,657,227 B2
(45) Date of Patent: Jun. 16, 2026

(54) MACHINE LEARNING BASED SPEND CLASSIFICATION

(71) Applicant: Oracle International Corporation, Redwood Shores, CA (US)

(72) Inventors: Akash Baviskar, Maharashtra (IN); Krishnan Ramanathan, Kadubeesanahalli (IN); Abhilash Neog, Tarajan (IN); Dipawesh Pawar, Deopur (IN); Karthik Bangalore Mani, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 125 days.

(21) Appl. No.: 17/903,161

(22) Filed: Sep. 6, 2022

(65) Prior Publication Data

US 2024/0037482 A1 Feb. 1, 2024

(30) Foreign Application Priority Data

Jul. 26, 2022 (IN) .............................. 202241042852

(51) Int. Cl.
*G06F 16/35* (2025.01)
*G06F 40/211* (2020.01)
*G06F 40/49* (2020.01)

(52) U.S. Cl.
CPC ............ *G06F 16/35* (2019.01); *G06F 40/211* (2020.01); *G06F 40/49* (2020.01)

(58) Field of Classification Search
CPC ........ G06F 16/35; G06F 40/30; G06F 16/353; G06F 40/49; G06F 40/242; G06F 40/211; G06F 40/284
USPC .......................................................... 704/9
See application file for complete search history.

(56) References Cited

U.S. PATENT DOCUMENTS

| | | | | |
|---|---|---|---|---|
| 9,361,377 B1* | 6/2016 | Azari | .................... | G06F 16/951 |
| 9,483,740 B1* | 11/2016 | Ansel | .................... | G06F 40/284 |
| 10,949,623 B2* | 3/2021 | Galitsky | ................. | G06F 40/35 |
| 11,144,827 B1* | 10/2021 | Levy | ....................... | G06F 40/20 |
| 2012/0179633 A1* | 7/2012 | Ghani | .................... | G06F 16/35 |
| | | | | 706/12 |
| 2012/0271627 A1* | 10/2012 | Danielyan | ............... | G06F 40/30 |
| | | | | 704/9 |
| 2014/0172652 A1* | 6/2014 | Pobbathi | .............. | G06Q 10/087 |
| | | | | 705/28 |

(Continued)

OTHER PUBLICATIONS

Jiali Yun, Liping Jing, Jian Yu, Houkuan Huang, A multi-layer text classification framework based on two-level representation model, Expert Systems with Applications, vol. 39, Issue 2, 2012, pp. 2035-2046 (Year: 2012).*

Jahanshahi, Hadi, Ozan Ozyegen, Mucahit Cevik, Beste Bulut, Deniz Yiğit, Fahrettin Firat Gonen and Ayse Basar. "Text Classification for Predicting Multi-level Product Categories." (2021): n. pag.*

Arzucan Özgür. "Supervised and Unsupervised Machine Learning Techniques for Text Document Categorization" Jan. 2004. Boğaziçi University.*

(Continued)

*Primary Examiner* — Richemond Dorvil
*Assistant Examiner* — Rodrigo A Chavez
(74) *Attorney, Agent, or Firm* — Potomac Law Group, PLLC

(57) ABSTRACT

Embodiments classify a product to a product category. Embodiments receive a textual description of the product and create an index of product categories. Embodiments use a plurality of classifiers to classify the textual description to one of the product categories, the classifiers including an index based classifier, an encyclopedia based classifier, a Bayes' rule based classifier, and an embeddings classifier.

20 Claims, 6 Drawing Sheets

(56) References Cited

U.S. PATENT DOCUMENTS

| | | | | |
|---|---|---|---|---|
| 2014/0214845 | A1 | 7/2014 | Garera et al. | |
| 2016/0224662 | A1* | 8/2016 | King | G06N 20/00 |
| 2018/0032508 | A1* | 2/2018 | Matskevich | G06F 40/242 |
| 2018/0165554 | A1* | 6/2018 | Zhang | G06N 20/10 |
| 2019/0065589 | A1* | 2/2019 | Wen | G06F 16/353 |
| 2020/0349199 | A1* | 11/2020 | Jayaraman | G06F 40/49 |
| 2021/0090694 | A1* | 3/2021 | Colley | G16H 50/50 |
| 2021/0264203 | A1 | 8/2021 | Fuxman et al. | |
| 2022/0138423 | A1* | 5/2022 | Zhu | G06N 3/09 |
| | | | | 704/9 |
| 2022/0237368 | A1* | 7/2022 | Tran | G06F 21/32 |
| 2023/0066233 | A1* | 3/2023 | van Dam | G06F 40/30 |
| 2023/0102892 | A1* | 3/2023 | Wu | G06F 40/30 |
| | | | | 707/737 |
| 2024/0037482 | A1* | 2/2024 | Baviskar | G06F 40/211 |

OTHER PUBLICATIONS

Jiang, et al, "A Survey on Large Language Model Hallucination via a Creativity Perspective" arXiv preprint, 9 pgs, Feb. 2, 2024.
Malhotra, "What if LLM Hallucinations Were A Feature And Not A Bug? Meet dreamGPT: An Open-Source GPT-Based Solution That Uses Hallucinations From Large Language Models (LLMs) As A Feature", Mark Tech Post, 2 pgs, May 20, 2023.
Sahu et al., "Data Augmentation for Intent Classification with Off-the-shelf Large Language Models" Proceedings of the 4th Workshop on NLP for conversational AI, pp. 47-57, May 27, 2022.
Unknown, "DivergentAI/dreamgpt: Leverage hallucinations from large language models (llms) for novelty-driven explorations", 2 pgs, Aug. 27, 2023.
U.S. Appl. No. 18/056,463, filed May 24, 2024, Oracle Financial Services Software Limited.

* cited by examiner

BAYES RULE BASED
CLASSIFIER 205

Predict
Using Trained
Model

Preprocess
Item
Descriptions

Train Bayes
Rule on
scraped Data

Input Item
Descriptions

Scrape and
Pre-Process
training data
with UNSPSC
Labels

504

503

502

501

MACHINE LEARNING BASED SPEND CLASSIFICATION

One embodiment is directed generally to a computer system, and in particular to spend classification using a computer system.

BACKGROUND INFORMATION

Spend classification is the process of assigning a category to different items and services bought for a business or other entity. All businesses engage in some form of spend management activities, intended to improve purchasing costs and lower supply base risk through the efficient use of a limited set of resources. The effectiveness of these types of activities are directly linked to the quality of the spend analytics available to the organization. Unless a business has a clear picture of what its buying and from whom these goods and services are sourced, it will only be able to make marginal improvements to its spend performance.

Even for organizations with a high degree of control over the buying activity carried out across their business, effective analysis of spending patterns can often be challenging due to poor or inconsistent classification of all of the various transactions. Without accurate categorization of data for past spending activity, no amount of analysis can yield the information necessary to fully optimize sourcing decisions, assess the supply base and conduct effective negotiations. For organizations with lower levels of spending control, these issues are only exacerbated.

In general, spend activity for an organization will be tracked unevenly across spend categories through a variety of requisitions, purchase orders, receipts, invoices, and expenses. Even where all of these transactions are utilized aggressively and processed through the same system, ensuring that category coding is consistently applied is a constant challenge due to patchwork catalogs, compliance hiccups, and user fatigue. Even for regular and repeatable purchasing activity that is automated by contract agreement, there may still be circumstances that require occasional one-off ordering that ends up being wrongly categorized or might only be handled through additional unmatched invoices.

With ad hoc spending needs, requesters rarely know how to categorize their purchases, which can result in significant transactions being processed as general or miscellaneous spending. In circumstances where a requester or buyer does try to code an item of spending, they may face multiple similar choices and pick the incorrect category. For example, in classifying installing electric vehicle ("EV") charging points, is it (Facilities) Maintenance, (Facilities) Hardware, or (Energy) Electricity?

Ensuring accurate spend classification is made more challenging by continually evolving organizational spend patterns that regularly see categories becoming less significant or obsolete and new categories appearing to replace them. Often, these changes only become apparent well after the business shift in spending has occurred, requiring historic spend details to be reclassified against an updated category taxonomy. The same type of challenge can exist with spend analysis activities, with senior management personnel changes leading to changes in analysis requirements and reporting structures.

Unless these categorization problems are resolved, spend analysis will be flawed. Spending patterns will be misrepresented, with spend data being spread inaccurately across different categories, making it difficult for managers to monitor trends, identify sourcing opportunities and negotiate more effectively with their supply base.

SUMMARY

Embodiments classify a product to a product category. Embodiments receive a textual description of the product and create an index of product categories. Embodiments use a plurality of classifiers to classify the textual description to one of the product categories, the classifiers including an index based classifier, an encyclopedia based classifier, a Bayes' rule based classifier, and an embeddings classifier.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

One embodiment is a machine learning based system that generally uses unsupervised training functionality to accurately and efficiently assign spend classification categories to different items and services. Embodiments automatically map a product or service name to its correct category. "Product" used herein also includes services.

Spend classification provides a clear visualization on the spends of an organization and gives the opportunity to optimize the spends. Further, spend classification helps to understand risks, creates transparency in the process, increases cost awareness and promotes efficient use of resources.

Known approaches for automated spend classification generally rely solely on supervised machine learning algorithms. However, the drawback of supervised algorithms is that labelled data is needed for model training. Further, manually creating labelled data for any classification problem with a very high number of classes is infeasible. In contrast, spend classification in accordance to embodiments primarily uses unsupervised algorithms, thus saving the effort required for labelling the data. Embodiments further automate the work for creating labelled data for training when labelled data is needed.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
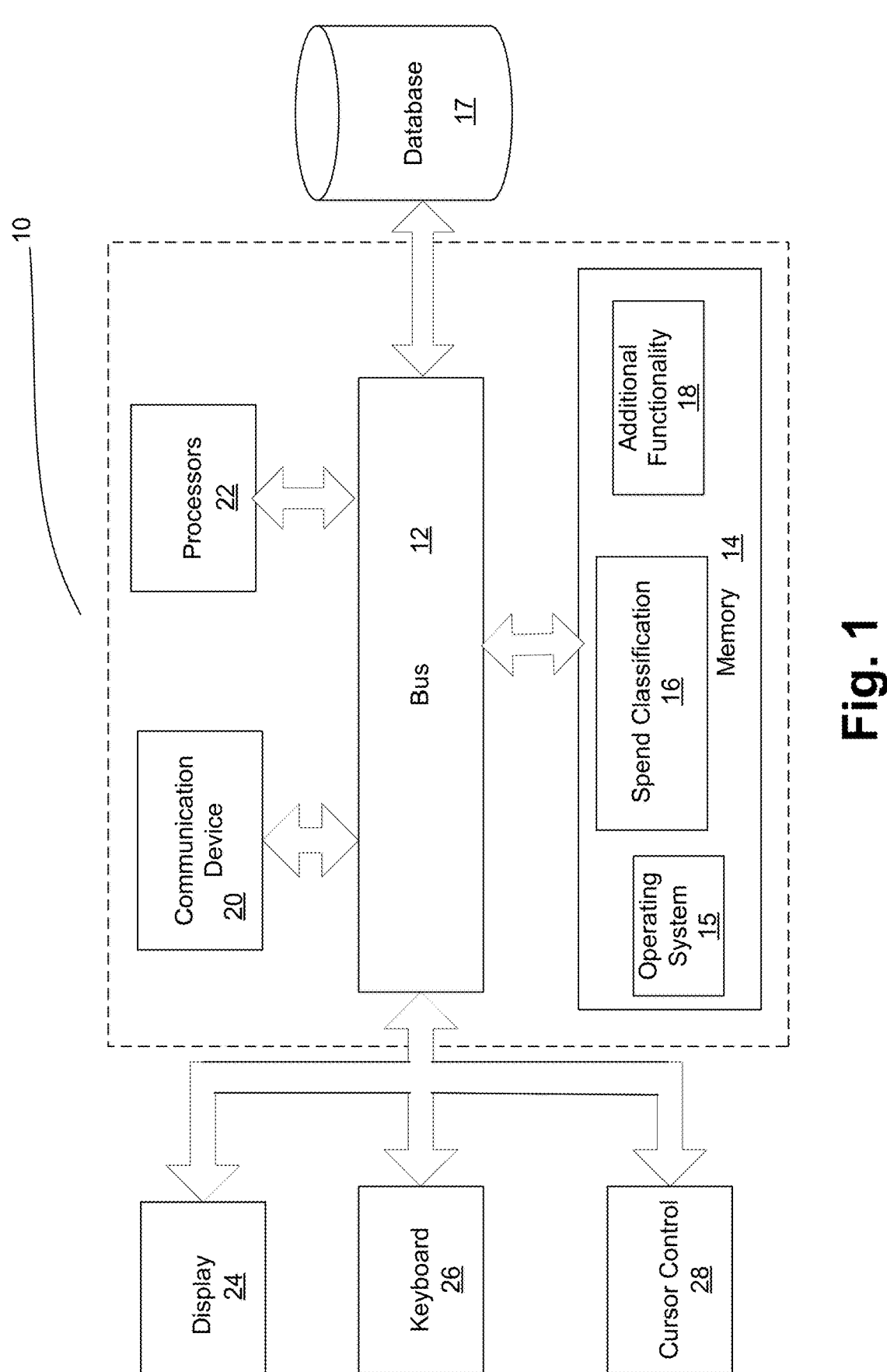
FIG. 1 is a block diagram of a computer server/system in accordance with an embodiment of the present invention that can be used to implement any of the functionality disclosed herein.

FIG. 1 is a block diagram of a computer server/system 10 in accordance with an embodiment of the present invention that can be used to implement any of the functionality disclosed herein. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include spend classification module 16 that performs spend classification using multiple classifiers, and all other functionality disclosed herein. System 10 can be part of a larger system. Therefore, system 10 can include one or more additional functional modules 18 to include the additional functionality that can utilize spend classification functionality, such as "Fusion Procurement" from Oracle Corp. A file storage device or database 17 is coupled to bus 12 to provide centralized storage for modules 16 and 18, including training data, predefined spend classification categories, etc. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Figure 2:
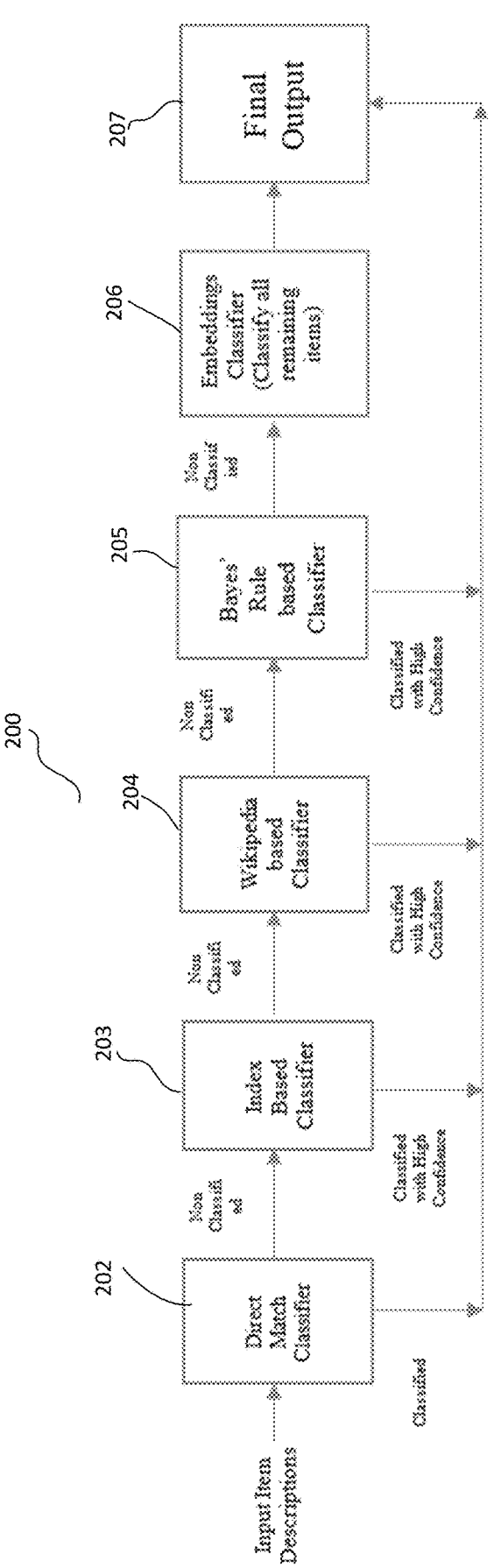
FIG. 2 is a flow/block diagram and system of the functionality of the spend classification module of FIG. 1 for performing spend classification in accordance with one embodiment.

FIG. 2 is a flow/block diagram and system 200 of the functionality of spend classification module 16 of FIG. 1 for performing spend classification in accordance with one embodiment. In one embodiment, the functionality of the flow diagram of FIG. 2 (and FIGS. 3-6 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

System 200 uses five sequential classifiers in a single pipeline. The classifiers include: (1) a direct match classifier 202; (2) an index based classifier 203; (3) a Wikipedia based classifier 204; (4) a Bayes' Rule based classifier 205; and (5) an embedding classifier 206. Classifiers 202 and 203 are syntactic match classifiers, which generally match exact words and phrases. Classifiers 204-206 are semantic match classifiers, which match words and phrases based on the intent of each.

Embodiments utilize a predefined definition listing of all possible spend categories. In one embodiment, the United Nations Standard Products and Services Code ("UNSPSC") taxonomy is used to define all possible spend categories. The UNSPSC is a taxonomy of products and services for use in eCommerce. It is a four-level hierarchy coded as an eight-digit number, with an optional fifth level adding two more digits. Table 1 below shows the number of distinct categories for each of the four required levels of the UNSPSC:

TABLE 1

| UNSPSC Taxonomy Level | Number of distinct categories |
|---|---|
| Segment | 57 |
| Family | 465 |
| Class | 5313 |
| Commodity | 71502 |

Given an inputted textual description of an item purchased, embodiments use a combination of supervised and unsupervised machine learning approaches to classify the item into a predefined set of categories. Embodiments classify at the UNSPSC commodity level shown in Table 1 above, which includes 71502 total distinct categories. In general, embodiments solve a text classification problem with 71502 categories/classes.

In one embodiment, a user can be asked for information about the "Business of the enterprise" using a UI parameter and can restrict the number of categories from 71502 to some subset of categories which are relevant to the enterprise only. This will help in reducing the ambiguity of the problem. Also, similar categories can be clubbed together to form single category. For example, the following three categories 1. Wooden Pencil, 2. Plastic pencil, 3. Metallic pencil can be replaced with a single category called "Pencil."

Embodiments pass each item description through the classifiers of FIG. 2 sequentially. Embodiments pass the item to each downstream classifier 202-206 until the item gets classified with a confidence score more than pre-defined threshold and is then provided as a final output 207. If an item is not classified using the top 4 classifiers in the pipeline (i.e., classifiers 202-205), then embodiments definitely classify it with the last classifier 206 in the pipeline regardless of confidence score.

Classifier 202 is a direct match classifier that operates by matching an item description with each UNSPSC category and makes a prediction only if the item description is exactly equal to a UNSPSC category. In general, only simple examples are handled by classifier 202. Item descriptions not classified by classifier 202 are passed to the next classifier 203 in the pipeline.

Classifier 203 is an index based classifier. In one embodiment, the "Apache Lucene" or "Lucene Index", which is an example of a robust syntactic text search engine, is implemented for classifier 203. However, other similar search indexes can be used in other embodiments.

Figure 3:
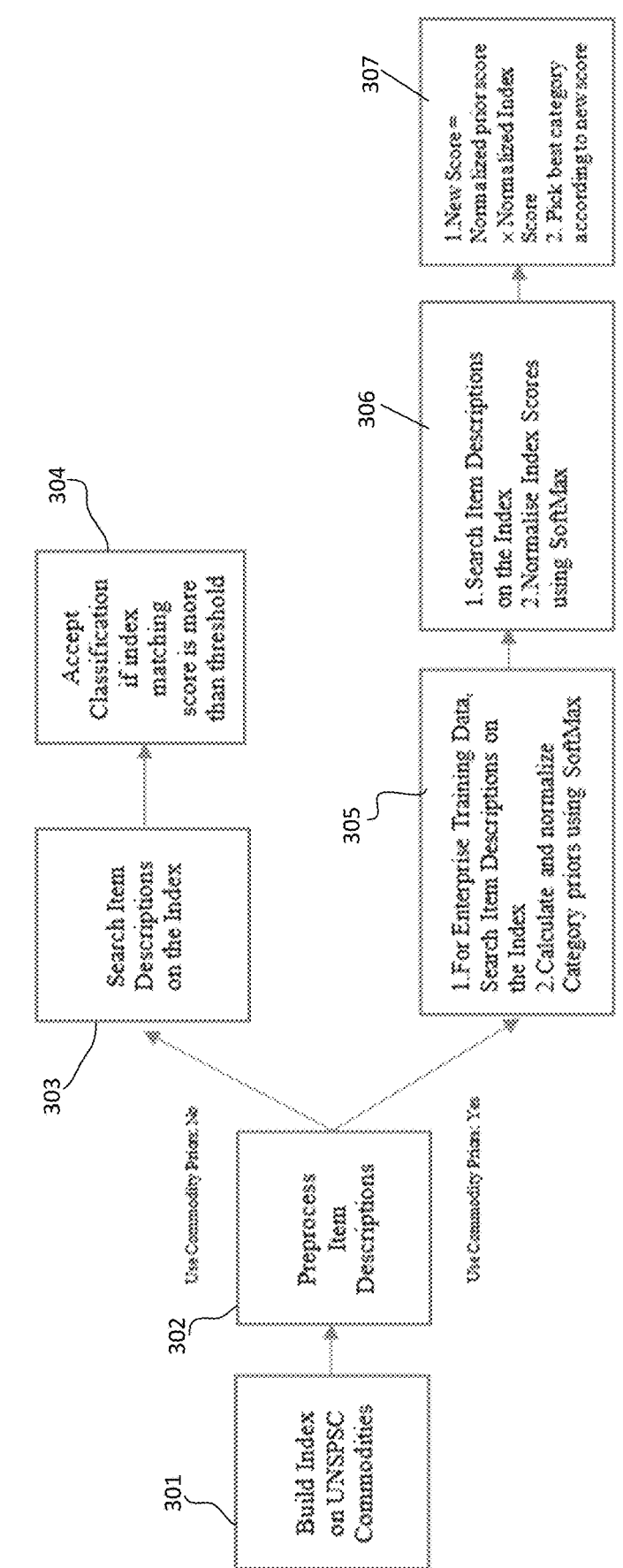
FIG. 3 is a flow diagram of the functionality of the classifier of FIG. 2 for performing index based classification in accordance with one embodiment.

FIG. 3 is a flow diagram of the functionality of classifier 203 of FIG. 2 for performing index based classification in accordance with one embodiment. Searching processed item descriptions on the index of classifier 203 will return the top matched categories with an index matching score. If index matching score is more than a predefined threshold, the prediction is accepted. Otherwise, the item is sent to the next classifier.

At 301, an index is built based on the 71502 UNSPSC commodity categories. Before creating the index on UNSPSC categories, embodiments preprocess the category names using preprocessing steps A, B, C and D disclosed below in conjunction with 302. There is no need to use preprocessing step E as collocations are applied on noisy data only.

At 302, the item descriptions are preprocessed for the index based classifier. In embodiments, the preprocessing includes the following:

A. Converting to lower case;

B. Keeping alphabetic characters only;

C. Removing stop words;

D. Converting words to base form using lemmatization using, in one embodiment, the Natural Language Toolkit ("NLTK"). Lemmatization is the process of grouping together the inflected forms of a word so they can be analyzed as a single item, identified by the word's lemma, or dictionary form;

E. Applying collocations. A collocation is a series of multiple words which co-occur with each other frequently. Sometimes, if the item description is noisy and not all words in the item description are important, replacing the original item description with highly frequent collocations in the item description gives better representation of items for the purpose of text classification. Embodiments train collocations on a corpus with a product dataset and use it for preprocessing item descriptions. For example, for item description "Dell monitor SE2222H VA Panel Full HD", "Dell Monitor" is important for classification purposes, and "SE2222H VA Panel Full HD" is not that important. Therefore, replacing the item description with "Dell monitor" is useful. Therefore, embodiments form bigrams and trigrams from item descriptions, and then concatenate all bigrams and trigram which are available in the trained list of collocations to form new product descriptions.

At 303, the item description is searched on the index built at 301. At 304, the classification is accepted if the index matching score is more than a predefined threshold.

Optionally, instead of 303 and 304, embodiments use enterprise specific category priors. Sometimes, if an enterprise buys items corresponding to a certain subset of categories only, using enterprise specific category prior probabilities can give better accuracy as compared to giving equal weightage to all 71502 categories. Therefore, if a particular enterprise has provided enough history data of items purchased in the past, embodiments will first classify the history items into categories using the above method (i.e., classifying history data using the same index based classifier of 301-304). Using this training data, embodiments can get category prior probabilities. These category prior probabilities are used as follows:

A. At 305, normalize category prior probabilities using the "softMax" function. The softmax function converts a vector of K real numbers into a probability distribution of K possible outcomes. It is a generalization of the logistic function to multiple dimensions, and used in multinomial logistic regression;

B. At 306, for every item in the scoring dataset, when the item description is searched on the index, embodiments consider the top 20 commodities matched by the index search. Embodiments normalize the index scores for these top 20 matches using the softMax function;

C. At 307, embodiments then create a new normalized score by multiplying the normalized index score with the normalized category prior probability. Embodiments then pick the category with the maximum new score.

Figure 4:
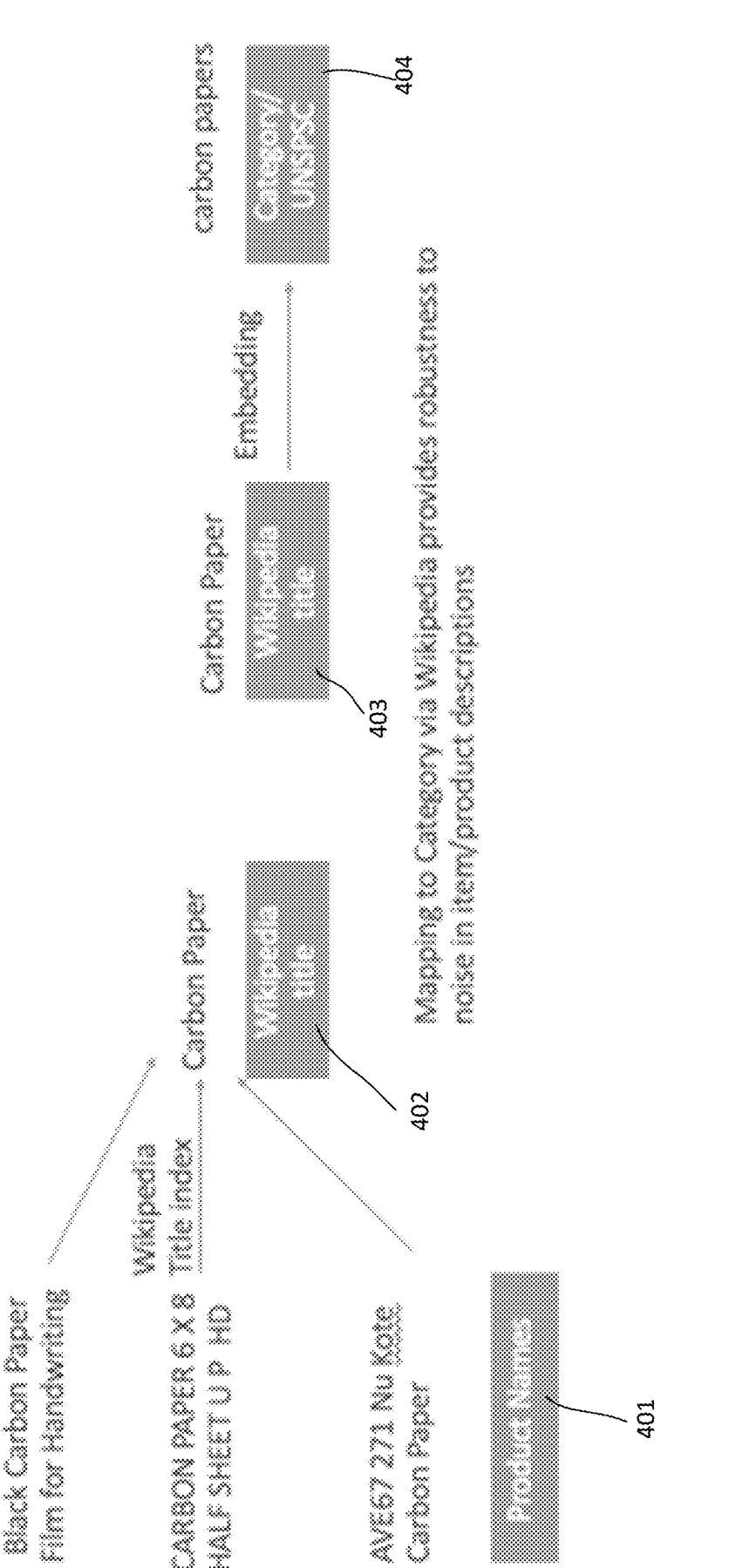
FIG. 4 is a flow diagram of the functionality of the classifier of FIG. 2 for performing Wikipedia based classification in accordance with one embodiment.

FIG. 4 is a flow diagram of the functionality of classifier 204 of FIG. 2 for performing Wikipedia based classification in accordance with one embodiment. Embodiments use the Wikipedia title dataset in this classifier. The Wikipedia database includes clean titles of all Wikipedia pages. Although Wikipedia is used in embodiments, any type of online available information source (i.e., an online encyclopedia) can be used that, similar to Wikipedia, provides a knowledge base of items/products at a granular level in order to map a "noisy" item description to a "clean" item description.

For mapping an item description to UNSPSC using classifier 204, embodiments perform the following:

A. Product names are received at 401, and then at 402 the item description is mapped to a Wikipedia title using an index build on top of Wikipedia titles;

B. At 403, 404, the UNSPSC categories are mapped with Wikipedia titles based on embedding similarity. Word embedding is the collective name for a set of language modeling and feature learning techniques in natural language processing ("NLP") where words or phrases from the vocabulary are mapped to vectors of real numbers. In general, word embeddings are numerical vectors representing strings. In one embodiment, a maximum top 10 Wikipedia titles are kept per UNSPSC category.

C. Embodiments then map the item description with a UNSPSC category based on Wikipedia title.

In generally, for the functionality of classifier 204, embodiments perform the following join operation:

Item-WikiPediatitle dataframe ⋈ _Wikipedia title_ Wikipedia-title-Category dataframe Embodiments use the Wikipedia title as a join bridge because mapping to a category via Wikipedia provides robustness to noise in item descriptions, the Wikipedia dataset contains global knowledge and is created by humans, and it contains clean titles at very granular level, so mapping using this bridge can be more accurate as compared to directly mapping item descriptions to a UNSPSC commodity category.

Figure 5:
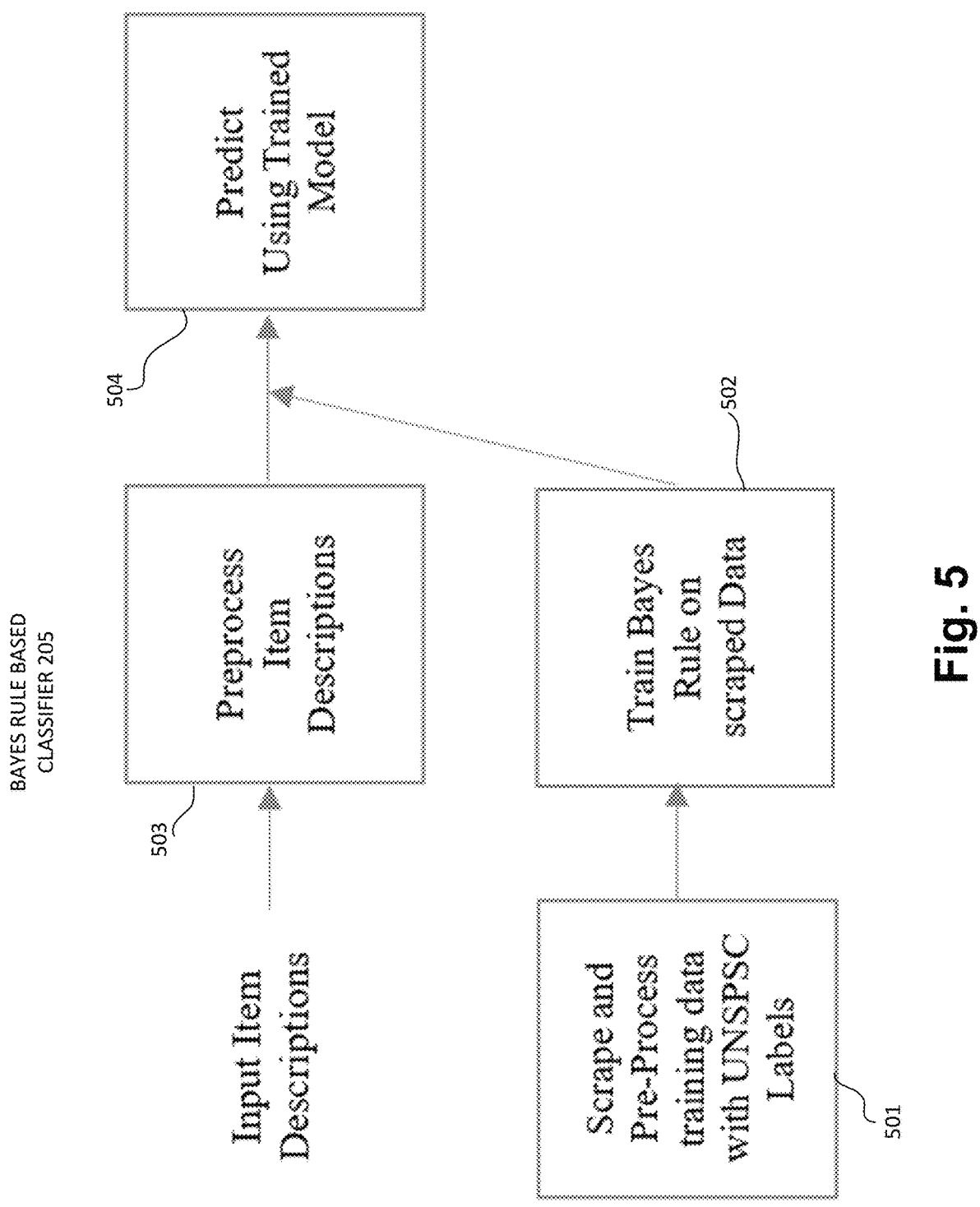
FIG. 5 is a flow diagram of the functionality of the classifier of FIG. 2 for performing Bayes' rule based classification in accordance with one embodiment.

FIG. 5 is a flow diagram of the functionality of classifier 205 of FIG. 2 for performing Bayes' rule based classification in accordance with one embodiment. Bayes' rule, in general, describes the probability of an event, based on prior knowledge of conditions that might be related to the event.

According to Bayes' rule, $P(Y|X)=P(X|Y)*P(Y)/P(X)$; $P(Y|x1, x2, x3, \ldots, xn)=P(x1, x2, \ldots xn|Y)*P(Y)/P(x1, x2, \ldots xn)$. In embodiments, "Y" refers to the UNSPSC category, "X" is the product description, and "$x_i$" refers to each word in the item description. The term "$P(x1, x2, \ldots, xn)$" in the right hand side of the equation is common, so it can be ignored in embodiments, and "$P(Y)$" is the prior probability of a category. For creating an enterprise specific model where category prior probabilities are not going to vary a lot over time, embodiments calculate and use prior probabilities $P(Y)$ using enterprise specific training data.

Therefore, $P(Y|x1, x2, x3, \ldots, xn) \propto P(x1, x2, \ldots xn|Y)*P(Y)$. Assuming X and Y are independent of each other, $P(Y/x1, x2, x3, \ldots, xn) \propto P(x1|Y)*P(x2|Y)* \ldots *P(xn|Y)*P(Y)$. Further, for building a generalized Bayes' model, which can be useful for multiple enterprises with different prior probabilities, category prior probabilities can be ignored.

Therefore, $P(Y|x1, x2, x3, \ldots, xn) \propto P(x1, x2, \ldots xn|Y)$; $P(Y|x1, x2, x3, \ldots xn) \propto P(x1|Y)*P(x2|Y)* \ldots *P(xn|Y)$. A Bayes' dictionary can be trained to get $P(x_i|Y)$ using the labelled dataset disclosed below.

Embodiments automatically generate labelled training data for training a supervised classifier based on Bayes' rule by using an online publicly available product dataset. A publicly available product dataset is used that includes a list of "textual product descriptions" mapped to categories labelled according to some taxonomy other than UNSPSC. For such product datasets, the generation of labels according to UNSPSC taxonomy by mapping products in the product dataset with UNSPSC categories is automated using embodiments disclosed herein.

The online labeled product dataset may include a list of product descriptions labeled according to the UNSPSC taxonomy. In this case, embodiments can directly use that dataset to train the Bayes' classifier. However, in embodiments where the online dataset is labelled according to some other taxonomy (e.g., an e-commerce business has defined its own taxonomy for classifying products), embodiments need to automatically generate the labels according to UNSPSC taxonomy.

If online dataset taxonomy is not exactly the same as UNSPSC taxonomy, embodiments create a mapping to UNSPSC taxonomy using embedding similarity. For example, assume there are 5 levels in the taxonomy. Embodiments will represent the product by creating a new string by appending level1 to level5 categories along with the product title and with a comma separator as shown in Table 2 below.

TABLE 2

| Level 1 | Level 2 | Level 3 | Level 4 | Level 5 | Product title |
|---|---|---|---|---|---|
| Clothing, Shoes & Jewellery | Women | Clothing | Tops, Tees & Blouses | Blouses & Button-Down Shirts | Women Blouse |

Similarly, embodiments form new strings representations for all UNSPSC categories by appending Segment, Family, Class and Commodity with comma separators. Product will be mapped to the Commodity with the best embedding similarity between new string representations. Therefore, embodiments generate a labelled dataset for training Bayes' rule at 501 by "scraping" and preprocessing data with UNSPSC labels. Specifically, embodiments scrape (i.e., using automatic scripts to download data from the Internet) or otherwise download the product dataset from the Internet. Embodiments then at 502 train Bayes' rule using the scraped data.

Before training and scoring, at 503, embodiments preprocess the item descriptions using the following functionality:

A. Converting to lower case;

B. Keeping alphabetic characters only;

C. Removing stop words; and

D. Lemmatization using off the shelf NLTK library.

Embodiments then provide a prediction at 504 using the trained Bayes' rule model.

Figure 6:
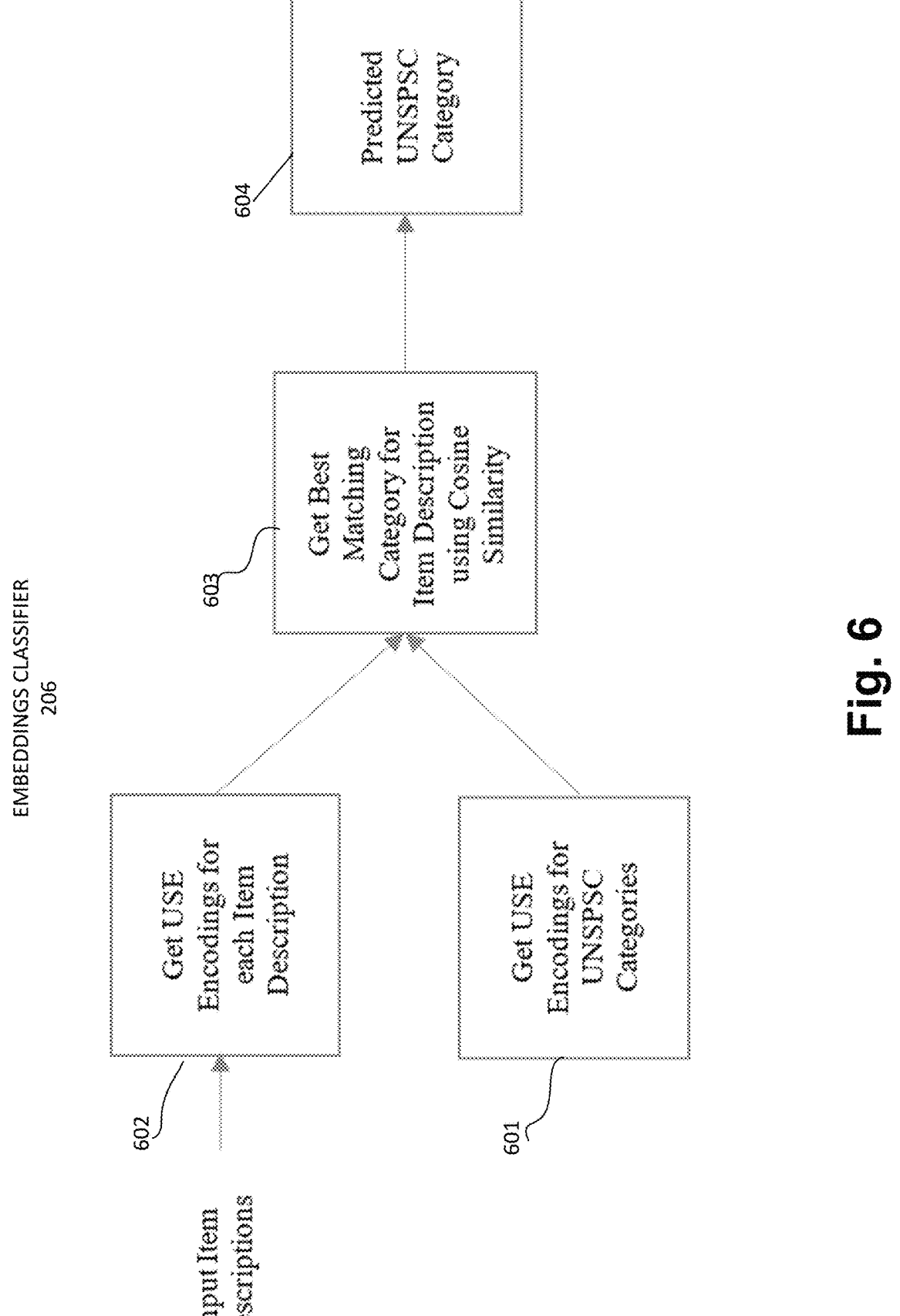
FIG. 6 is a flow diagram of the functionality of the classifier of FIG. 2 for performing embeddings based classification in accordance with one embodiment.

FIG. 6 is a flow diagram of the functionality of classifier 206 of FIG. 2 for performing embeddings based classification in accordance with one embodiment. Embodiments use a Universal Sentence Encoder ("USE") from Google Corp., but any other available embedding can be used. USE creates a numeric vector representation of an input textual description. These numeric vectors are similar for similar input texts and vary for different input texts. For example, vector representation of "apple" will be closer to vector representation of "orange" compared to vector representation of "country" as apple and orange are fruits and have different semantic meaning than country.

The USE contains global knowledge and is trained on a large corpus. The USE encodes text into high dimensional vectors that can be used for text classification, semantic similarity, clustering, and other natural language tasks. Embodiments use the USE to find semantic similarity between an item description and each UNSPSC category, and the prediction will be the UNSPSC category with maximum cosine similarity between encodings of item description and UNSPSC categories.

At 601, USE encodings are retrieved for the UNSPSC categories. At 602, USE encodings are retrieved for each item description. At 603, the best matching category is determined for the item description using Cosine similarity. At 604, the UNSPSC category is predicted. The output of classifier 206, if arrived at because no classification with high confidence was previously generated, is the final output at 207.

Embodiment can perform post-processing on the predicted categories using product prices such that exceptional predictions can be reviewed and get corrected. For example, assume there are 100 products which are predicted as the category "Pencil", and the price associated with 95% products out of these is around $1, and the price associated with other 5% products is $50. Now, as the price $50 seems to be on higher side for a pencil, it is possible that there is a wrong classification. Such cases can be reviewed and corrected.

Based on the results of successful classifications, embodiments use feedback to improve results, such as by retraining one or more of the models. The feedback includes implicit feedback, because Wikipedia based classifier 204, Bayes' rule-based classifier 205 and USE based embedding classifier 206 are improved by updating the knowledge base used in each of them. Specifically, new pages are added daily in the Wikipedia database by Wikipedia users, so Wikipedia based classifier 205 can be periodically updated with a new version of the Wikipedia database. Bayes' rule-based classifier 205 is a supervised machine learning based classifier and can be improved with a bigger and cleaner training dataset. The USE model is re-trained periodically on a newer web corpus and this will help incorporating new world knowledge for classifier 206.

The feedback includes explicit feedback, because users can be given the top 3 categories predicted by the present pipeline, and users can choose the best label out of the top 3 predictions, and this data can be added to the training data of Bayes' classifier 205.

Further, embodiments can adapt to new categories if the UNSPSC evolves to newer sets of categories. Embodiments can then change the older taxonomy and use the newest set of categories defined for all the classifiers in the pipeline.

As disclosed, embodiments use a multiple classifier pipeline to classify an input text description to one of many possible categories of products/services. Embodiments can predict the top x best possible categories with respective confidence scores.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of classifying a product to a product category, the method comprising:
   receiving a textual description of the product;
   creating an index of product categories;
   sequentially inputting the entire textual description to a sequence of different types of classifiers until the textual description is classified, with a confidence score above a predefined threshold, as one of the product categories, wherein the confidence score is determined for each classification output by one of the sequence of classifiers, and a determination is made after every output of the classifier, except a last classifier of the sequence, whether to input the textual description to the next classifier of the sequence of classifiers based on the confidence score;
   wherein a first plurality of the classifiers in a beginning of the sequence are unsupervised classifiers, followed by one or more supervised classifiers;
   wherein a first textual description corresponding to a first product is classified after being input to each of the first plurality of the classifiers without being input to the one or more supervised classifiers;
   wherein a second textual description corresponding to a second product is classified after being input to the first plurality of the classifiers and the one or more supervised classifiers;
   wherein the sequence of classifiers comprise a plurality of syntactic match classifiers and a plurality of semantic match classifiers;
   wherein the unsupervised classifiers comprise an index based classifier followed by an encyclopedia based classifier and the one or more supervised classifiers comprise a Bayes' rule based classifier followed by an embeddings classifier.

2. The method of claim 1, wherein the encyclopedia based classifier uses an online encyclopedia comprising a plurality of subjects with corresponding titles.

3. The method of claim 2, further comprising:
   mapping the textual description to one of the titles using an index build of the titles;
   mapping the product categories to the titles based on embedding similarity; and
   mapping the textual description to the product category based on the title.

4. The method of claim 1, wherein the sequence of classifiers form a pipeline comprising, in sequential order, two syntactic match classifiers followed by three semantic match classifiers, wherein for each classifier a classification is output when the threshold is reached.

5. The method of claim 1, wherein the index based classifier preprocesses the textual description of the product, the preprocessing comprising:

converting to lower case;

keeping alphabetic characters only;

removing stop words;

converting words to base form using lemmatization; and applying collocations.

6. The method of claim 1, wherein the Bayes' rule based classifier is trained using a publicly available online dataset, further comprising automatically labeling the online dataset.

7. The method of claim 1, wherein the embeddings classifier uses a Universal Sentence Encoder to determine sematic similarly between the textual description and one or more of the product categories.

8. A non-transitory computer readable medium having instructions stored thereon that, when executed by one or more processors, cause the processors to classify a product to a product category, the classifying comprising:

receiving a textual description of the product;

creating an index of product categories;

sequentially inputting the entire textual description to a sequence of different types of classifiers until the textual description is classified, with a confidence score above a predefined threshold, as one of the product categories, wherein the confidence score is determined for each classification output by one of the sequence of classifiers, and a determination is made after every output of the classifier, except a last classifier of the sequence, whether to input the textual description to the next classifier of the sequence of classifiers based on the confidence score;

wherein a first plurality of the classifiers in a beginning of the sequence are unsupervised classifiers, followed by one or more supervised classifiers;

wherein a first textual description corresponding to a first product is classified after being input to each of the first plurality of the classifiers without being input to the one or more supervised classifiers;

wherein a second textual description corresponding to a second product is classified after being input to the first plurality of the classifiers and the one or more supervised classifiers;

wherein the sequence of classifiers comprise a plurality of syntactic match classifiers and a plurality of semantic match classifiers;

wherein the unsupervised classifiers comprise an index based classifier followed by an encyclopedia based classifier and the one or more supervised classifiers comprise a Bayes' rule based classifier followed by an embeddings classifier.

9. The computer readable medium of claim 8, wherein the encyclopedia based classifier uses an online encyclopedia comprising a plurality of subjects with corresponding titles.

10. The computer readable medium of claim 9, further comprising:

mapping the textual description to one of the titles using an index build of the titles;

mapping the product categories to the titles based on embedding similarity; and mapping the textual description to the product category based on the title.

11. The computer readable medium of claim 8, wherein the sequence of classifiers form a pipeline comprising, in sequential order, two syntactic match classifiers followed by three semantic match classifiers, wherein for each classifier a classification is output when the threshold is reached.

12. The computer readable medium of claim 8, wherein the index based classifier preprocesses the textual description of the product, the preprocessing comprising:

converting to lower case;

keeping alphabetic characters only;

removing stop words;

converting words to base form using lemmatization; and applying collocations.

13. The computer readable medium of claim 8, wherein the Bayes' rule based classifier is trained using a publicly available online dataset, further comprising automatically labeling the online dataset.

14. The computer readable medium of claim 8, wherein the embeddings classifier uses a Universal Sentence Encoder to determine sematic similarly between the textual description and one or more of the product categories.

15. A spend classification system comprising:

one or more processors configured to classify a product to a product category by:

receiving a textual description of the product;

creating an index of product categories;

sequentially inputting the entire textual description to a sequence of different types of classifiers until the textual description is classified, with a confidence score above a predefined threshold, as one of the product categories, wherein the confidence score is determined for each classification output by one of the sequence of classifiers, and a determination is made after every output of the classifier, except a last classifier of the sequence, whether to input the textual description to the next classifier of the sequence of classifiers based on the confidence score;

wherein a first plurality of the classifiers in a beginning of the sequence are unsupervised classifiers, followed by one or more supervised classifiers;

wherein a first textual description corresponding to a first product is classified after being input to each of the first plurality of the classifiers without being input to the one or more supervised classifiers;

wherein a second textual description corresponding to a second product is classified after being input to the first plurality of the classifiers and the one or more supervised classifiers;

wherein the sequence of classifiers comprise a plurality of syntactic match classifiers and a plurality of semantic match classifiers;

wherein the unsupervised classifiers comprise an index based classifier followed by an encyclopedia based classifier and the one or more supervised classifiers comprise a Bayes' rule based classifier followed by an embeddings classifier.

16. The system of claim 15, wherein the encyclopedia based classifier uses an online encyclopedia comprising a plurality of subjects with corresponding titles.

17. The system of claim 16, the one or more processors further configured for:

mapping the textual description to one of the titles using an index build of the titles;

mapping the product categories to the titles based on embedding similarity; and mapping the textual description to the product category based on the title.

18. The system of claim 15, wherein the sequence of classifiers form a pipeline comprising, in sequential order, two syntactic match classifiers followed by three semantic match classifiers, wherein for each classifier a classification is output when the threshold is reached.

19. The system of claim 15, wherein the index based classifier preprocesses the textual description of the product, the preprocessing comprising:

converting to lower case;

keeping alphabetic characters only;

removing stop words;

converting words to base form using lemmatization; and applying collocations.

20. The system of claim 15, wherein the Bayes' rule based classifier is trained using a publicly available online dataset, the one or more processors further configured for automatically labeling the online dataset.

\* \* \* \* \*